(12) United States Patent
Liu et al.

(10) Patent No.: US 11,436,855 B2
(45) Date of Patent: Sep. 6, 2022

(54) METHOD FOR PERFORMING FINGERPRINT SENSING, ELECTRONIC MODULE CAPABLE OF PERFORMING FINGERPRINT SENSING, AND COMPUTING APPARATUS

(71) Applicant: NOVATEK MICROELECTRONICS CORP., Hsinchu (TW)

(72) Inventors: Ping Liu, Hsinchu (TW); Chi-Ting Chen, Hsinchu (TW)

(73) Assignee: NOVATEK MICROELECTRONICS CORP., Hsinchu (TW)

(*) Notice: Subject to any disclaimer, the term of this patent is extended or adjusted under 35 U.S.C. 154(b) by 13 days.

(21) Appl. No.: 17/110,327

(22) Filed: Dec. 3, 2020

(65) Prior Publication Data

US 2021/0303817 A1 Sep. 30, 2021

Related U.S. Application Data

(60) Provisional application No. 62/994,328, filed on Mar. 25, 2020.

(51) Int. Cl.
*G06V 40/13* (2022.01)
*G06F 3/044* (2006.01)
*G06V 40/12* (2022.01)

(52) U.S. Cl.
CPC .............. *G06V 40/13* (2022.01); *G06F 3/044* (2013.01); *G06V 40/1306* (2022.01); *G06V 40/1318* (2022.01); *G06V 40/1365* (2022.01)

(58) Field of Classification Search
None
See application file for complete search history.

(56) References Cited

U.S. PATENT DOCUMENTS

| 2012/0313913 | A1* | 12/2012 | Shiraki | G06V 40/1318 345/207 |
|---|---|---|---|---|
| 2016/0217310 | A1* | 7/2016 | Shah | G06V 40/67 |
| 2021/0224500 | A1* | 7/2021 | Wang | G06F 3/0412 |

* cited by examiner

*Primary Examiner* — Nicholas J Lee (57) ABSTRACT

A method for performing fingerprint sensing is introduced. The method includes performing a predetermined number of consecutive fingerprint sensing cycles; informing a processing unit that a fingerprint sensing driver is ready for providing pre-scanned fingerprint data after each cycle of a fingerprint sensing cycle set, wherein the fingerprint sensing cycle set includes at least one of the fingerprint sensing cycles except for a last one of the fingerprint sensing cycles; and providing the processing unit with the pre-scanned fingerprint data obtained from the each cycle of the fingerprint sensing cycle set. An electronic module capable of performing fingerprint sensing and a computing apparatus capable of performing the same are also provided.

22 Claims, 9 Drawing Sheets

METHOD FOR PERFORMING FINGERPRINT SENSING, ELECTRONIC MODULE CAPABLE OF PERFORMING FINGERPRINT SENSING, AND COMPUTING APPARATUS

CROSS-REFERENCE TO RELATED APPLICATION

This non-provisional application claims priority under 35 U.S.C. § 119(e) on U.S. provisional Patent Application No. 62/994,328 filed on Mar. 25, 2020, the entire contents of which are hereby incorporated by reference.

BACKGROUND OF THE INVENTION

1. Field of the Invention

The present disclosure relates to a technology for fingerprint sensing in a computing apparatus, and in particular to a method for performing fingerprint sensing, an electronic module capable of performing fingerprint sensing, and computing apparatus.

2. Description of the Related Art

For computing devices, such as smart phones, tablet computers or other information processing devices, fingerprint sensing now is becoming standard functionality of the computing devices to meet the emerging needs for enhancing security in various applications such as fingerprint identification in unlocking the computing device etc.

BRIEF SUMMARY OF THE INVENTION

An objective of the present disclosure is to provide a technology for fingerprint sensing for use in a computing apparatus. The technology is capable of performing fingerprint pre-scanning and providing pre-scanned fingerprint data to an application program, such as fingerprint identification, to facilitate the enhancement of the application's efficiency.

To achieve at least the above objective, the present disclosure provides a method for performing fingerprint sensing. The method comprises the following steps. A predetermined number of consecutive fingerprint sensing cycles are performed. A fingerprint sensing driver informs a processing unit that it is ready for providing pre-scanned fingerprint data after each cycle of a fingerprint sensing cycle set, wherein the fingerprint sensing cycle set includes at least one of the fingerprint sensing cycles except for a last one of the fingerprint sensing cycles. The processing unit is provided with the pre-scanned fingerprint data obtained from the each cycle of the fingerprint sensing cycle set.

In an embodiment, the pre-scanned fingerprint data is provided to the processing unit in response to a request from the processing unit after the informing is performed after the each cycle of the fingerprint sensing cycle set.

In an embodiment, the method further comprising obtaining fingerprint sensing data respectively from each of the fingerprint sensing cycles; and generating the pre-scanned fingerprint data after a current (i.e., the most recent) fingerprint sensing cycle of the fingerprint sensing cycle set, based on the fingerprint sensing data obtained from at least the current fingerprint sensing cycle of the fingerprint sensing cycle set.

In an embodiment, the pre-scanned fingerprint data is an average of the fingerprint sensing data obtained from the current fingerprint sensing cycle of the fingerprint sensing cycle set and the fingerprint sensing data obtained from at least one previous fingerprint sensing cycle of the fingerprint sensing cycle set prior to the current fingerprint sensing cycle.

In an embodiment, the method further comprises the following steps. The processing unit is informed that the fingerprint sensing driver is ready for providing final fingerprint data after the last one of the fingerprint sensing cycles. The final fingerprint data is provided to the processing unit in response to a request from the processing unit.

In an embodiment, the method further comprises the following steps. Fingerprint sensing data is obtained respectively associated with each of the fingerprint sensing cycles. The final fingerprint data is generated by averaging the fingerprint sensing data associated with each of the fingerprint sensing cycles.

In an embodiment, the method further comprises completing the predetermined number of consecutive fingerprint sensing cycles regardless of whether or not a match is achieved by the processing unit with the pre-scanned fingerprint data.

In an embodiment, the method further comprises the following steps. An informing signal is obtained from the processing unit indicating that a match is achieved and responsively, the predetermined number of consecutive fingerprint sensing cycles are ended.

In an embodiment, the fingerprint sensing cycle set includes every fingerprint sensing cycle before the last one of the fingerprint sensing cycles.

In an embodiment, the fingerprint sensing cycle set does not include every fingerprint sensing cycle before the last one of the fingerprint sensing cycles.

In an embodiment, each of the fingerprint sensing cycles includes operations including a reset operation, an exposure operation, and a sampling operation.

In an embodiment, the pre-scanned fingerprint data includes fingerprint image data.

In an embodiment, the pre-scanned fingerprint data includes information related to a fingerprint image.

In an embodiment, the pre-scanned fingerprint data includes a truncated fingerprint image obtained by the fingerprint sensing cycle.

In an embodiment, the fingerprint sensing cycle set includes two or more neighboring fingerprint sensing cycles.

In an embodiment, the pre-scanned fingerprint data includes a non-truncated fingerprint image obtained by the fingerprint sensing cycle.

In an embodiment, the fingerprint sensing cycle set does not include two or more neighboring fingerprint sensing cycles.

In an embodiment, the method further comprises, after one of the fingerprint sensing cycles is performed, updating content of a memory by the fingerprint sensing driver using corresponding fingerprint sensing data obtained from the one of the fingerprint sensing cycles.

In an embodiment, the method further comprises performing a fingerprint identification process based on the pre-scanned fingerprint data.

To achieve at least the above objectives, the present disclosure provides an electronic module capable of performing fingerprint sensing. The electronic module comprises a fingerprint sensing driver including a fingerprint sensing circuit for being coupled to a fingerprint sensor and obtaining fingerprint sensing data; and a control unit, coupled to the fingerprint sensing circuit, for performing a predetermined number of consecutive fingerprint sensing cycles, wherein the control unit is configured to inform a processing unit that the fingerprint sensing driver is ready for providing pre-scanned fingerprint data after each cycle of a fingerprint sensing cycle set, wherein the fingerprint sensing cycle set includes at least one of the fingerprint sensing cycles except for a last one of the fingerprint sensing cycles; and the control unit is configured to provide the processing unit with the pre-scanned fingerprint data obtained from the each cycle of the fingerprint sensing cycle set.

To achieve at least the above objectives, the present disclosure provides a computing apparatus. The computing apparatus comprises a fingerprint sensor; a processing unit; and an electronic module capable of performing fingerprint sensing, coupled between the fingerprint sensor and the processing unit. The electronic module comprises a fingerprint sensing driver, coupled to the fingerprint sensor, for obtaining fingerprint sensing data, wherein the fingerprint sensing driver is configured to perform a predetermined number of consecutive fingerprint sensing cycles, the fingerprint sensing driver is configured to inform the processing unit that the fingerprint sensing driver is ready for providing pre-scanned fingerprint data after each cycle of a fingerprint sensing cycle set, wherein the fingerprint sensing cycle set includes at least one of the fingerprint sensing cycles except for a last one of the fingerprint sensing cycles; and the fingerprint sensing driver is configured to provide the processing unit with the pre-scanned fingerprint data obtained from the each cycle of the fingerprint sensing cycle set.

In some embodiments of the electronic module or computing apparatus, the control unit or the fingerprint sensing driver is configured to provide the pre-scanned fingerprint data to the processing unit in response to a request from the processing unit after the informing is performed after the each cycle of the fingerprint sensing cycle set.

In some embodiments of the electronic module or computing apparatus, the fingerprint sensing circuit or the fingerprint sensing driver is configured to obtain fingerprint sensing data respectively from each of the fingerprint sensing cycles; and the control unit is configured to generate the pre-scanned fingerprint data after a current fingerprint sensing cycle of the fingerprint sensing cycle set, based on the fingerprint sensing data obtained from at least the current fingerprint sensing cycle of the fingerprint sensing cycle set.

In some embodiments of the electronic module or computing apparatus, the pre-scanned fingerprint data is an average of the fingerprint sensing data obtained from the current fingerprint sensing cycle of the fingerprint sensing cycle set and the fingerprint sensing data obtained from at least one previous fingerprint sensing cycle of the fingerprint sensing cycle set prior to the current fingerprint sensing cycle.

In some embodiments of the electronic module or computing apparatus, the control unit or the fingerprint sensing driver is configured to inform the processing unit that the fingerprint sensing driver is ready for providing final fingerprint data after the last one of the fingerprint sensing cycles; and to provide the final fingerprint data to the processing unit in response to a request from the processing unit.

In some embodiments of the electronic module or computing apparatus, the fingerprint sensing circuit or the fingerprint sensing driver is configured to obtain fingerprint sensing data respectively associated with each of the fingerprint sensing cycles; and the control unit or the fingerprint sensing driver is configured to generate the final fingerprint data by averaging the fingerprint sensing data associated with each of the fingerprint sensing cycles.

In some embodiments of the electronic module or computing apparatus, the control unit or the fingerprint sensing driver is configured to complete the predetermined number of consecutive fingerprint sensing cycles regardless of whether a match is achieved by the processing unit with the pre-scanned fingerprint data.

In some embodiments of the electronic module or computing apparatus, the control unit or the fingerprint sensing driver is configured to receive an informing signal from the processing unit indicating that a match is achieved and responsively, ending the predetermined number of consecutive fingerprint sensing cycles.

In some embodiments of the electronic module or computing apparatus, the fingerprint sensing cycle set includes every fingerprint sensing cycle before the last one of the fingerprint sensing cycles.

In some embodiments of the electronic module or computing apparatus, the fingerprint sensing cycle set does not include every fingerprint sensing cycle before the last one of the fingerprint sensing cycles.

In some embodiments of the electronic module or computing apparatus, each of the fingerprint sensing cycles includes operations including a reset operation, an exposure operation, and a sampling operation.

In some embodiments of the electronic module or computing apparatus, the pre-scanned fingerprint data includes fingerprint image data.

In some embodiments of the electronic module or computing apparatus, the pre-scanned fingerprint data includes information related to fingerprint image.

In some embodiments of the electronic module or computing apparatus, the pre-scanned fingerprint data includes a truncated fingerprint image obtained by the fingerprint sensing cycle.

In some embodiments of the electronic module or computing apparatus, the fingerprint sensing cycle set includes two or more neighboring fingerprint sensing cycles.

In some embodiments of the electronic module or computing apparatus, the pre-scanned fingerprint data includes a non-truncated fingerprint image obtained by the fingerprint sensing cycle.

In some embodiments of the electronic module or computing apparatus, the fingerprint sensing cycle set does not include two or more neighboring fingerprint sensing cycles.

In some embodiments of the electronic module or computing apparatus, the control unit or the fingerprint sensing driver is configured to, after one of the fingerprint sensing cycles is performed, update content of a memory by the fingerprint sensing driver using corresponding fingerprint sensing data obtained from the one of the fingerprint sensing cycles.

In some embodiments of the electronic module or computing apparatus, a fingerprint identification process is performed based on the pre-scanned fingerprint data, or the processing unit is configured to perform a fingerprint identification process based on the pre-scanned fingerprint data.

In some embodiments, the electronic module is a single chip.

DETAILED DESCRIPTION OF THE INVENTION

To facilitate understanding of the object, characteristics and effects of this present disclosure, embodiments together with the attached drawings for the detailed description of the present disclosure are provided.

The following provides various embodiments for the technology for fingerprint sensing for use in a computing apparatus. The technology is capable of performing fingerprint pre-scanning and providing pre-scanned fingerprint data to an application program, such as fingerprint identification, to facilitate the enhancement of the application's efficiency.

For the sake of illustration, in the following, embodiments of an electronic module capable of performing fingerprint sensing and a computing apparatus (or device) employing the electronic module are introduced firstly. Then, embodiments of a method for performing fingerprint sensing are provided.

Figure 1:
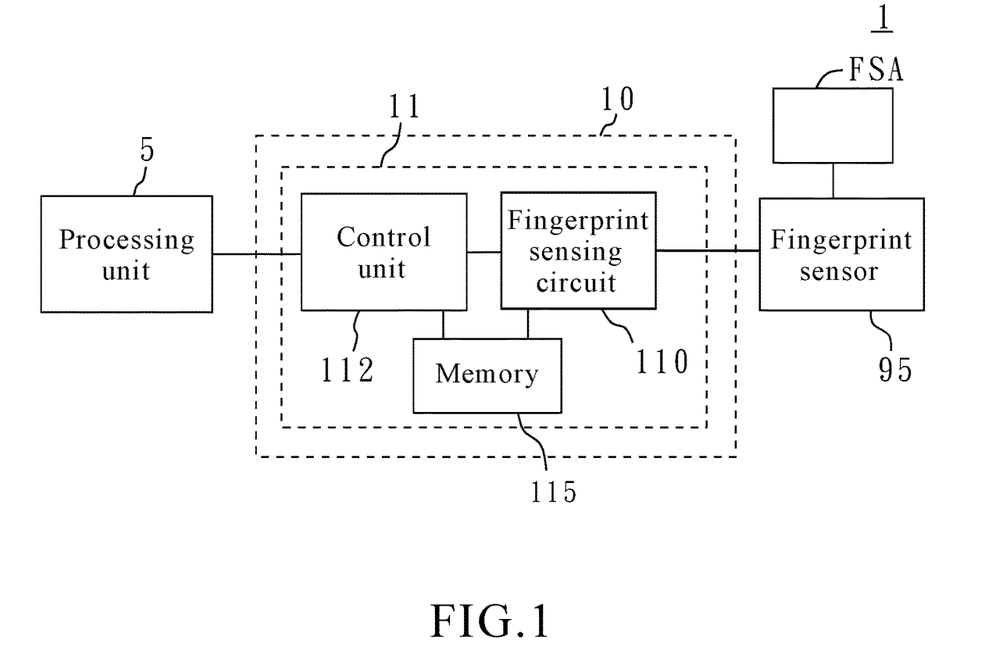
FIG. 1 is a schematic diagram illustrating a computing device having a fingerprint sensing driver according to embodiments.

Referring to FIG. 1, an electronic module 10 capable of performing fingerprint sensing is illustrated, which can be employed in a computing device 1, according to embodiments of the present disclosure in block diagram form. As shown in FIG. 1, the computing device 1 includes a processing unit 5, an electronic module 10 including a fingerprint sensing driver 11, and a fingerprint sensor 95. The electronic module 10 can be utilized for being coupled between the fingerprint sensor 95 and the processing unit 5 to perform fingerprint sensing. The electronic module 10, as will be exemplified later, can be configured to perform a method for performing fingerprint sensing illustrated in FIG. 3.

Based on the computing device 1 illustrated in FIG. 1, any electronic device such as a smart phone, tablet computer or any other information processing device can be realized, wherein the computing device 1 may further include, but not limited to, additional components such as memory, circuits for wireless or wired communication, image capturing or so on, whenever appropriate.

The processing unit 5 is capable of being configured to receive fingerprint data from the electronic module 10 to provide specific functionality. For example, the processing unit 5 executes an application program, based on fingerprint identification, for example, under an operating system to obtain fingerprint image data derived from signals obtained from the fingerprint sensor 95 through the electronic module 10. The computing device 1 (e.g., smart phone, tablet, and so on) can be configured to perform one of operations (e.g., user operation or function in a game) of the application program, which are associated with the fingerprint image data generated by the electronic module 10.

In FIG. 1, the electronic module 10 includes a fingerprint sensing driver 11 that can be utilized for being coupled to the fingerprint sensor 95 and obtaining fingerprint sensing data from signals from the fingerprint sensor 95. For example, the fingerprint sensor 95 is implemented to include a plurality of fingerprint sensing elements (or called pixels) in an arrangement over a fingerprint sensing area (FSA). For example, the fingerprint sensing driver 11 is implemented for converting fingerprint signals received from the fingerprint sensor 95 into corresponding digital fingerprint data, such as a set of raw fingerprint data associated with and distributed over the fingerprint sensing area FSA, as illustrated in FIG. 1. The fingerprint data can be further obtained based on the digital fingerprint data, for example, by the fingerprint sensing driver 11. In addition, the fingerprint sensing area FSA can be implemented corresponding to at least one portion of a screen of a display panel where a finger can be placed, or can be implemented corresponding to any surface on the computing device 1. The electronic module 10 can be implemented as a chip, for example.

As shown in FIG. 1, the fingerprint sensing driver 11 may include a fingerprint sensing circuit 110 and a control unit 112 for fingerprint sensing. For example, the fingerprint sensing circuit 110 may include a fingerprint analog front-end (AFE) circuit for converting fingerprint signals received from the fingerprint sensor 95 into corresponding digital fingerprint data, such as a set of raw fingerprint data associated with and distributed over the fingerprint sensing area FSA where a fingerprint (or a portion of a fingerprint) is detected. The fingerprint sensing data can be further obtained based on the digital fingerprint data, for example, by the control unit 112.

The control unit 112, coupled to the fingerprint sensing circuit 110, can be utilized for fingerprint sensing, for example, to generate fingerprint sensing data based on the digital fingerprint data.

Figure 2A:
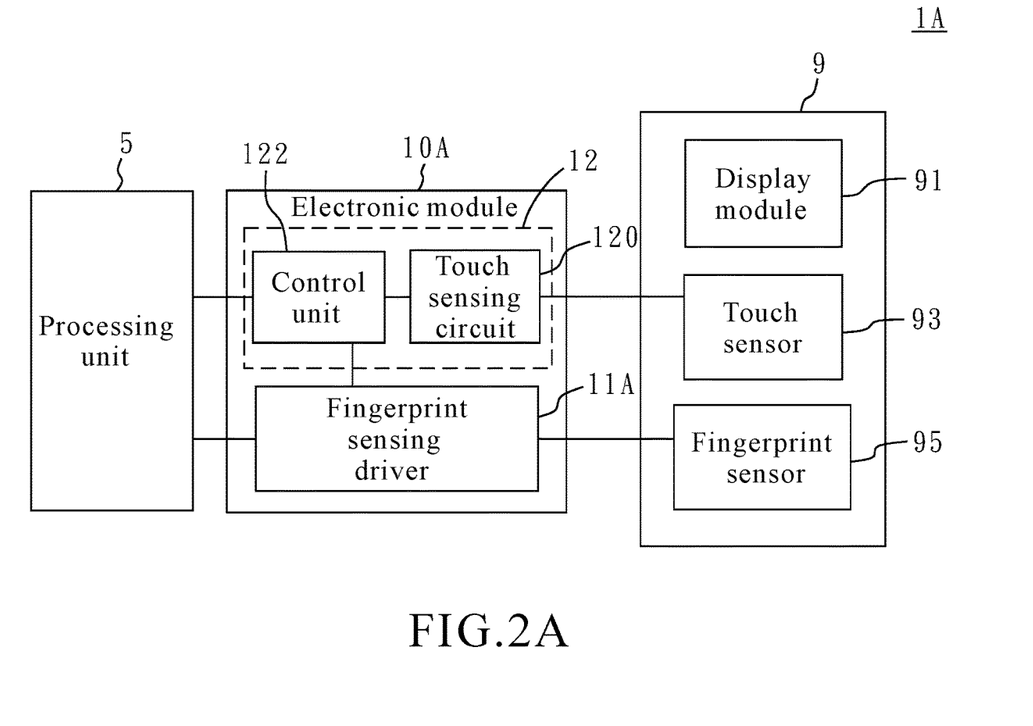
FIG. 2A is a block diagram illustrating implementation of an electronic module capable of performing fingerprint sensing in a computing device according to an embodiment.

Referring to FIG. 2A, another embodiment of an electronic module capable of performing fingerprint sensing is illustrated, which can be employed in a computing device 1A. As shown in FIG. 2A, an electronic module 10A, as an embodiment based on the electronic module 10 in FIG. 1, includes a fingerprint sensing driver 11A and a touch sensing module 12. The electronic module 10A can be utilized for being coupled between a touch sensor 93, a fingerprint sensor 95, and a processing unit 5.

The fingerprint sensing driver 11A may include a fingerprint sensing circuit 110 and a control unit 112 for fingerprint sensing in accordance with those in FIG. 1.

The display panel 9 includes a display module 91, such as a liquid crystal display (LCD) module, organic light emitting diode (OLED) module, a display module based on LEDs (such as mini-LED display or micro-LED display), and is associated with the touch sensor 93 and fingerprint sensor 95. The display panel 9, for example, can be implemented by an in-cell type or on-cell type touch display panel integrated with fingerprint sensing, wherein the display module 91, the touch sensor 93, and the fingerprint sensor 95 are integrated in a layered manner or any appropriate manner. The touch sensor 93 may be implemented by using a capacitive touch sensor 93 in a form of touch sensing array. The fingerprint sensor 95, for example, can be implemented by an optical fingerprint sensor, capacitive fingerprint sensor, ultrasonic fingerprint sensor, or any device for sensing fingerprint signals. In some embodiments, the fingerprint sensor 95 is implemented to detect at least one portion of the screen of the display module 91. In a preferred embodiment, the fingerprint sensor 95 is a full-screen fingerprint sensor 95, which can cover an area corresponding to the screen of the display module 91 and a touch sensing area provided by the touch sensor 93. Certainly, the implementation of the present disclosure is not limited to the above examples.

The electronic module 10A capable of performing fingerprint sensing can be utilized to be coupled to the touch sensor 93 and fingerprint sensor 95 associated with the display panel 9. In an embodiment, the touch sensing module 12 may include a touch sensing circuit 120 and a control unit 122. From the viewpoint of the processing unit 5, the electronic module 10A may serve as a "bridge" between the processing unit 5 and the display panel 9. The processing unit 5 may be configured to control the electronic module 10A to obtain output touch data and/or output fingerprint data accordingly.

The touch sensing circuit 120 can be utilized for being coupled to the touch sensor 93 and obtaining touch sensing data. For example, the touch sensing circuit 120 may include a touch analog front-end (AFE) circuit for converting analog touch signals received from the touch sensor 93 into corresponding digital touch data, such as a set of raw touch data associated with and distributed over an area on the screen of the display panel 9 where at least one touch is detected. The touch sensing data can be further obtained based on the digital touch data, for example, by the control unit 122.

For example, the control unit 122 is coupled to the touch sensing circuit 120 and the fingerprint sensing driver 11. In an example, the control unit 122 obtains the touch sensing data based on the digital touch data outputted by the touch sensing circuit 120.

In the above examples, the fingerprint sensing circuit 110 or touch sensing circuit 120 each may include an analog front-end circuit implemented by circuit components such as a low-noise amplifier, an analog-to-digital converter. In the above examples, the control unit 112 or 122 is complemented by using a processor, microcontroller, or programmable circuit such as field-programmable gate array (FPGA) or application-specific integrated circuit (ASIC). In an example, the control units 112 and 122 are implemented by using a single control unit. Certainly, the implementation of the present disclosure is not limited to the above examples.

Figure 2B:
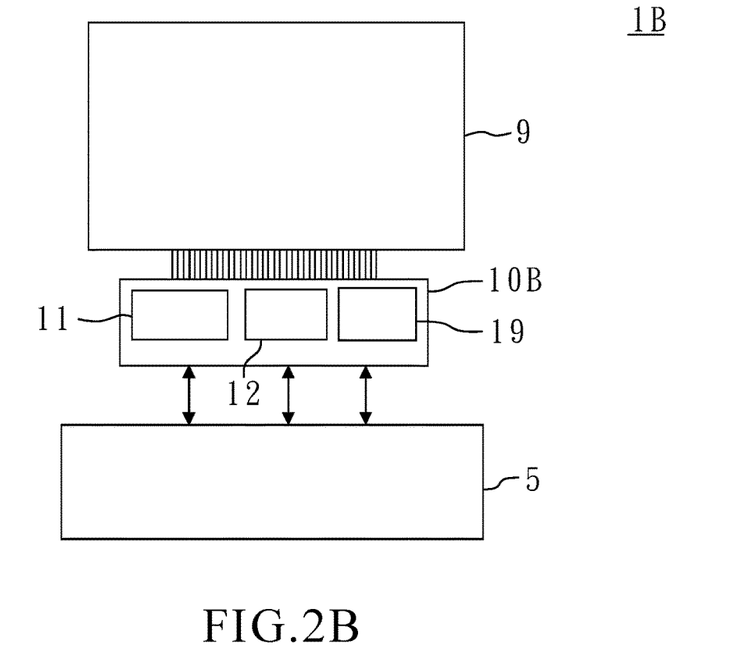
FIG. 2B is a block diagram illustrating implementation of an electronic module capable of performing fingerprint sensing in a computing device according to an embodiment.

In an embodiment, the electronic module (e.g., 10 or 10A) illustrated in FIG. 1 or 2A is implemented in a single chip, thus leading to many benefits of circuit integration to the computing device 1. Refer to FIG. 2B, which illustrates examples of implementation of a single chip based on the configuration of the electronic module (e.g., 10 or 10A) of FIG. 1 or 2A. As shown in FIG. 2B, an electronic module 10B is implemented in a single chip form, employed in a computing device 1B, and includes a fingerprint sensing driver 11 (or 11A) and a touch sensing module 12. The electronic module 10B may further include a display driving module 19 for being connected to the display module 91.

It is noted the electronic module 10, in some embodiments, is implemented using multiple chips, according to design requirements while the electronic module 10 or 10A illustrated in FIG. 1 or 2A is implemented in a single chip. For example, in some embodiments, the touch sensing module and the fingerprint sensing driver is implemented as different chips. In an embodiment shown in FIG. 2C, an electronic module 10C (e.g., implemented in accordance with that of FIG. 1 or 2A) is employed in a computing device 1C and includes a first chip 21 and a second chip 22. The first chip 21 includes a fingerprint sensing driver 11 while the second chip 22 includes a touch sensing module 12. The first chip 21 may further include a display driving module 19 for being connected to the display module 91 to drive the display module 91. Certainly, the implementation of the present disclosure is not limited to the examples.

Embodiments of a method for performing fingerprint sensing will be illustrated below.

Figure 3:
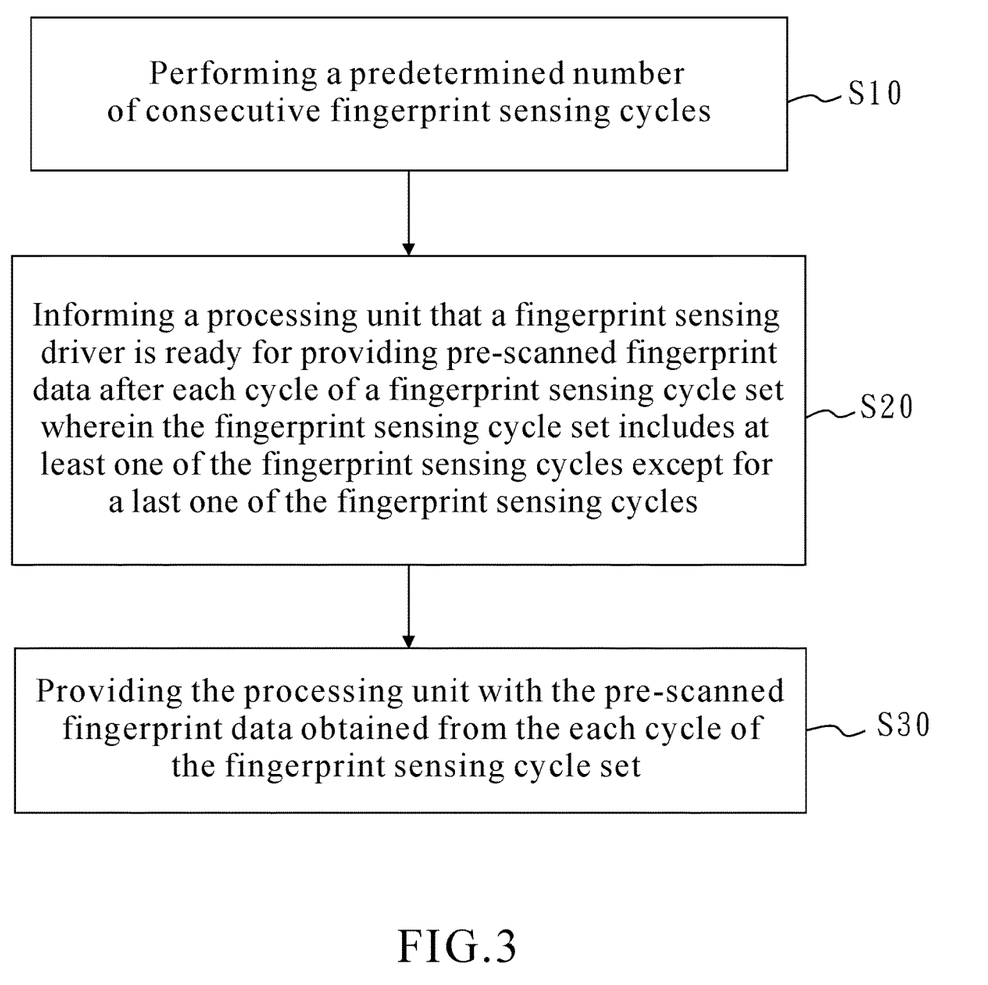
FIG. 3 is a flowchart illustrating a method for performing fingerprint sensing according to embodiments.

Referring to FIG. 3, a method for performing fingerprint sensing is illustrated according to an embodiment in flowchart form. The method for performing fingerprint sensing can be implemented in an electronic module (e.g., 10, 10A, 10B, or 10C) or specifically a fingerprint sensing driver (e.g., 11), which is for being used to be coupled between a fingerprint sensor 95 and a processing unit 5. As shown in FIG. 3, the method includes the following steps, wherein the electronic module 10 (or 10A) of FIG. 1 (or FIG. 2A) is referenced for the sake of illustration only.

As indicated by step S10, a predetermined number of consecutive fingerprint sensing cycles are performed. Each fingerprint sensing cycle is associated with a series of the same or different operations for fingerprint sensing. For example, the series of the operations may include at least one of a resetting operation, an exposure operation, and a sampling operation for reading the sensing signals provided by the fingerprint sensor.

As indicated by step S20, the method informs a processing unit (e.g., processing unit 5 in any one of FIGS. 1, 2A-2C) that a fingerprint sensing driver (e.g., 11 or 11A) is ready for providing pre-scanned fingerprint data after each cycle of a fingerprint sensing cycle set, wherein the fingerprint sensing cycle set includes at least one of the fingerprint sensing cycles except for the last one of the fingerprint sensing cycles. In step S20, the fingerprint sensing cycle set indicates that informing the processing unit can be performed after each of one or more cycles of the fingerprint sensing cycles except for the last cycle. In an example, if a fingerprint sensing cycle includes only one of the fingerprint sensing cycles, the phrase "each cycle of a fingerprint sensing cycle set" indicates the one of the fingerprint sensing cycles. The step S20, for example, is performed by the fingerprint sensing driver 11 or 11A (e.g., the control unit 112).

As indicated by step S30, the method provides the processing unit with the pre-scanned fingerprint data obtained from the each cycle of the fingerprint sensing cycle set. The step S30, for example, is performed by the fingerprint sensing driver 11 or 11A (e.g., the control unit 112). The processing unit may execute an application program based on fingerprint identification.

The pre-scanned fingerprint data may include at least one of fingerprint image information, and information about measured brightness for an image frame and etc. In some embodiments, the fingerprint sensing cycle set includes every fingerprint sensing cycle before the last one of the fingerprint sensing cycles. This means that pre-scanned fingerprint data is provided to the processing unit after each of the non-last fingerprint sensing cycle(s). In these embodiments, the provided pre-scanned fingerprint data may include any data obtained or available after a most recent (i.e., current) fingerprint sensing cycle. As an example, the provided pre-scanned fingerprint data may include the fingerprint data obtained from the most recent fingerprint sensing cycle. As another example, the provided pre-scanned fingerprint data may include the fingerprint data calculated based on all of the previous fingerprint sensing cycle(s). In other embodiments, the fingerprint sensing cycle set does not include every fingerprint sensing cycle before the last one of the fingerprint sensing cycles. This means that that pre-scanned fingerprint data is provided to the processing unit only after each cycle of the fingerprint sensing cycle set which includes a portion of the non-last fingerprint sensing cycles.

It is noted that after the step S30, steps associated with the last fingerprint sensing cycle can be still performed. More specifically, the method may inform the processing unit that the fingerprint sensing driver is ready for providing fingerprint data after the last one of the fingerprint sensing cycles and can then provide the processing unit with the fingerprint data obtained from at least one of the predetermined number of the consecutive fingerprint sensing cycles, for example, an average of the image data of all of the consecutive fingerprint sensing cycles. In different implementations, the steps associated with the last fingerprint sensing cycle can be performed as default steps, by completing the predetermined number of consecutive fingerprint sensing cycles regardless of whether a match is achieved by the processing unit with the pre-scanned fingerprint data. Alternatively, the steps associated with the last fingerprint sensing cycle can be performed as optional steps required when a predetermine condition is met, for example, if fingerprint identification based on only the pre-scanned fingerprint data cannot be made.

Consequently, the pre-scanned fingerprint data obtained by performing the at least one fingerprint sensing cycle prior to the last fingerprint sensing cycle can be provided to the processing unit in advance without waiting until all the fingerprint sensing cycles to provide the processing unit with the fingerprint data.

Based on the method, the electronic module (e.g., 10, 10A, 10B, or 10C) as exemplified above can be configured to perform fingerprint sensing, to facilitate the enhancement of the performance or efficiency of practical applications such as an application program based on fingerprint identification in accordance with pre-scanned fingerprint data provided by the method.

The following illustrates how the method of FIG. 3 facilitates the enhancement of the application program's efficiency.

In order to reduce noise interference on fingerprint sensing, a practical approach to fingerprint sensing can be implemented as follows. The electronic module (e.g., 10 or 10A) can be configured to perform a predetermined number of consecutive fingerprint sensing cycles, as indicated in step S10 of FIG. 3. Each fingerprint sensing cycle is associated with a series of circuit operations for fingerprint sensing (such as reset, exposure, sampling for an optical fingerprint sensor) and results in a piece of fingerprint sensing data for that fingerprint sensing cycle. Final fingerprint data can be generated eventually by performing data operations (e.g., averaging) based on all pieces of fingerprint sensing data obtained from the predetermined number of consecutive fingerprint sensing cycles. In this practical approach, the electronic module can provide the final fingerprint data for the processing unit only after the predetermined number of consecutive fingerprint sensing cycles are completed.

In order words, if it is required to reduce noise interference on the fingerprint sensing by adopting the above approach that performs multiple fingerprint sensing cycles, it is necessary for the processing unit to wait until the predetermined number of consecutive fingerprint sensing cycles are completed to obtain the final fingerprint data (e.g., a fingerprint image). The waiting time is approximately equal to the predetermined number of consecutive fingerprint sensing cycles multiplied by the total time to complete one fingerprint sensing cycle that is associated with a series of circuit operations for fingerprint sensing (such as reset, exposure, sampling for an optical fingerprint sensor).

As discussed above, the electronic module can provide the final fingerprint data for the processing unit only after the predetermined number of consecutive fingerprint sensing cycles are completed in the practical approach. The efficiency of the application program executed by the processing unit may be affected by the waiting time. In contrast, compared to the practical approach, the method of FIG. 3, as shown in step S20, informs the processing unit (e.g., processing unit 5 in any one of FIGS. 1, 2A-2C) that a fingerprint sensing driver (e.g., 11 or 11A) is ready for providing pre-scanned fingerprint data after each cycle of a fingerprint sensing cycle set, which is not the last one of the fingerprint sensing cycles; and then the method, as shown in step S30, provides the processing unit with the pre-scanned fingerprint data obtained from the each cycle of the fingerprint sensing cycle set. In this way, the processing unit, which executes the application program based on fingerprint identification, can be configured to process the pre-scanned fingerprint data early before the final fingerprint data is available in order to proceed with the fingerprint identification and process of the application program in advance. Therefore, the method can facilitate the performance or efficiency of practical applications such as an application program based on fingerprint identification in accordance with pre-scanned fingerprint data provided by the method.

Figure 4:
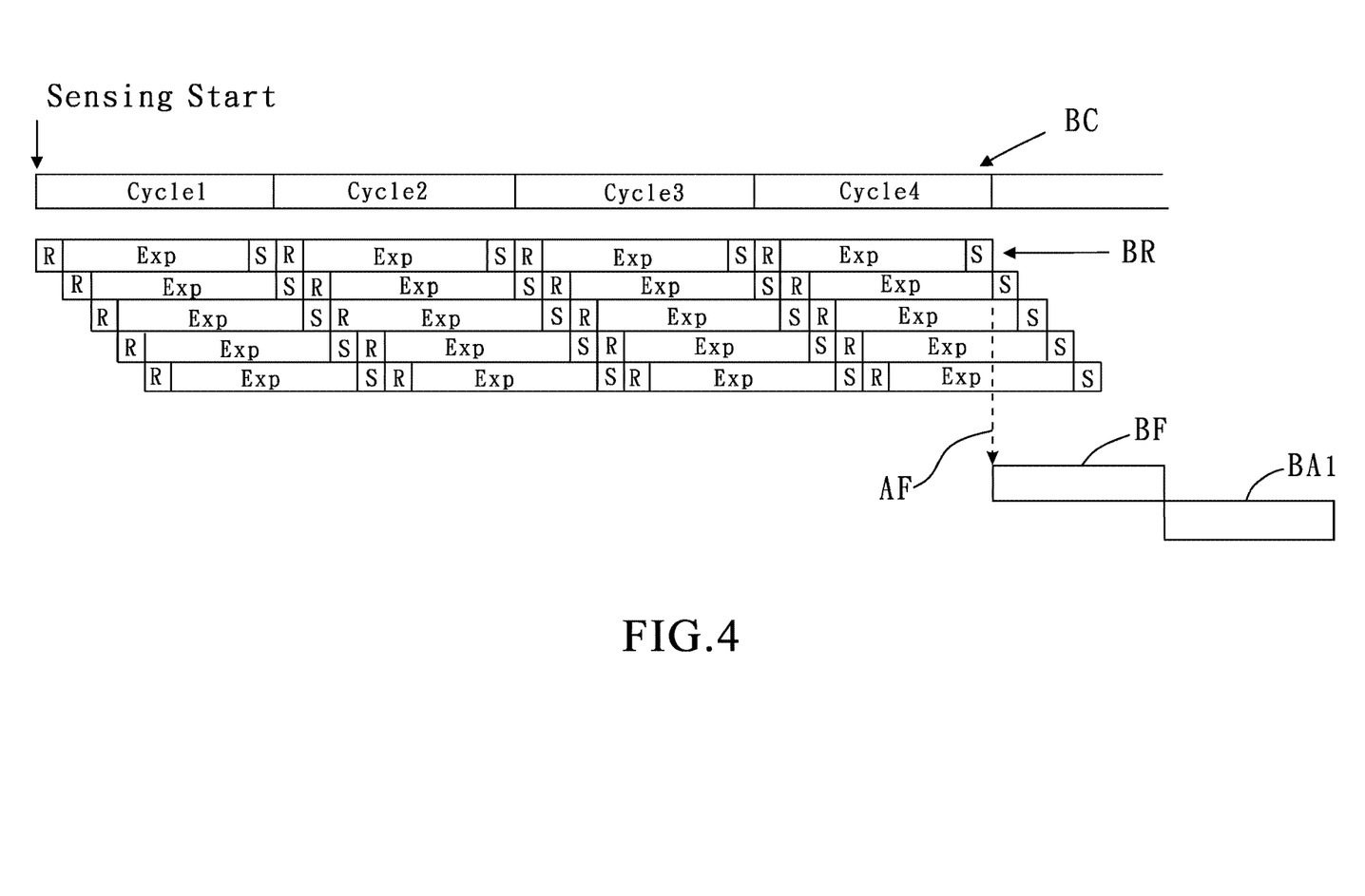
FIG. 4 is a schematic timing diagram illustrating an example of providing final fingerprint data for an application program after a predetermined number of consecutive fingerprint sensing cycles.

For the sake of illustration, referring to FIG. 4, an example of providing final fingerprint data for an application program after a predetermined number of consecutive fingerprint sensing cycles is illustrated in a schematic timing diagram. As shown in FIG. 4, the predetermined number of consecutive fingerprint sensing cycles (or called scan cycles) is four cycles, such as those represented by a row of blocks (or called a block row BC) with symbols "Cycle1" to "Cycle4" shown in FIG. 4 from left to right sides, representing the sequence of the cycles. The data output of final fingerprint data (e.g., final average image), represented by a block BF in FIG. 4, is performed in order for the application program to read the final fingerprint data after the fourth cycle (such as Cycle4) is completed, and then the application program (which can execute a corresponding algorithm or process) performs subsequent operations such as comparison for fingerprint identification. As shown in FIG. 4, a block BA1 represents that the application program proceeds with its processing after the data output of final fingerprint data, as represented by the block BF.

In order to represent the operations corresponding to a fingerprint sensor (e.g., fingerprint sensor 95) which may include a plurality of fingerprint sensing elements during the fingerprint sensing cycles, one or more block rows BR each including blocks R, EXP, S are shown in FIG. 4 under the block row BC representing the fingerprint sensing cycles, wherein a block R represents a reset period, a block EXP represents an exposure period, and a subsequent block S represents a time period for sampling. Each block row BR including the blocks R, EXP, S represents that reset, exposure, and sampling operations may (but not limitingly) be performed on a corresponding set (e.g. a row) of fingerprint sensing elements of the fingerprint sensor respectively for the reset, exposure, and sampling periods. In addition, a downward dashed arrow (e.g. indicated by AF) connected to the end of the first block row BR represents the fingerprint sensing cycle (e.g., the last cycle) for the corresponding set of fingerprint sensing elements is completed. It is also noted that the downward dashed arrow (e.g., AF or other) is shown in FIG. 4 or other Figures for the sake of conceptual illustration. As in FIG. 4, the downward dashed arrow AF is illustrated to represent that the fourth fingerprint sensing cycle (e.g., the last cycle in this example) for the fingerprint sensor has been completed. However, if the reset, exposure, and sampling operations are required to be performed on all of the fingerprint sensing elements of the fingerprint sensor in a row by row manner, the actual completion time for the fourth fingerprint sensing cycle will be the time when the reset, exposure, and sampling operations are completed for all rows of the fingerprint sensing elements. For example, if the fingerprint sensor has 5 rows of fingerprint sensing elements, the actual completion time will be the time when the 5 block row BR, as illustrated in FIG. 4, are completed. However, the implementation of the present invention is not limited by the above examples.

Figure 5:
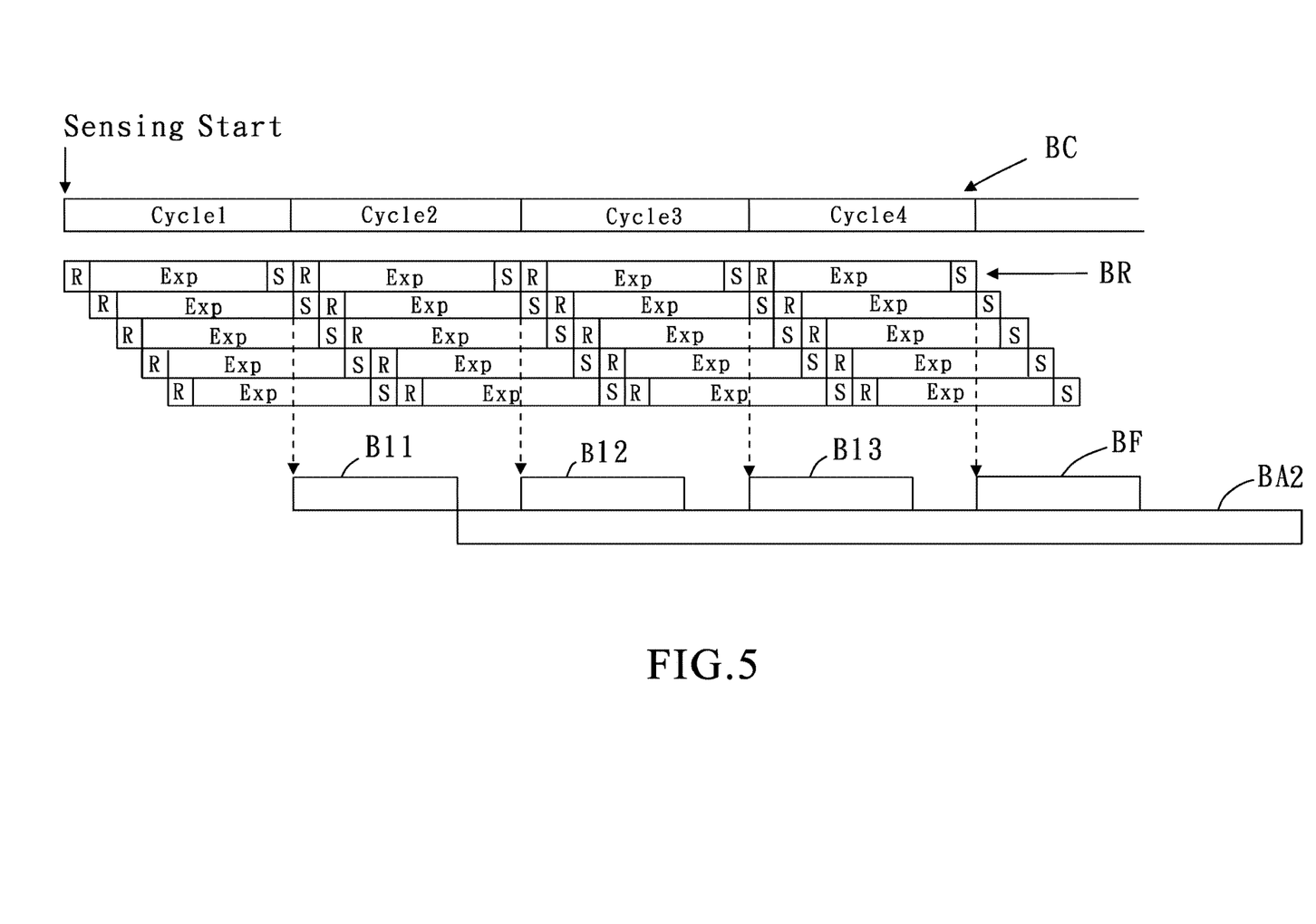
FIG. 5 is a schematic timing diagram illustrating an example of providing pre-scanned fingerprint data for an application program after at least one of the fingerprint sensing cycles, which is not the last fingerprint sensing cycle.

In an example based on the method of FIG. 3, referring to FIG. 5, after each fingerprint sensing cycle (e.g., represented by Cycle1, Cycle2, Cycle3) of the predetermined number of consecutive fingerprint sensing cycles for capturing data, the method can provide corresponding pre-scanned fingerprint data of the current (i.e., the most recent) fingerprint sensing cycle for the application program, which can be referred to as pre-scanning process, in addition to the final fingerprint data (e.g., fingerprint image averaged after the completion of the fingerprint sensing cycles). In FIG. 5, blocks B11, B12, B13 represent the corresponding time periods that corresponding pre-scanned fingerprint data are prepared and outputted to the processing unit after the first, second, and third fingerprint sensing cycle, respectively, while a block BA2 represents that the application program's process proceeds after the data output of the pre-scanned fingerprint data is performed (e.g., by step S30). When the last (e.g., fourth) fingerprint sensing cycle is completed, the final fingerprint data is prepared and outputted to the processing unit, as represented by the block BF. As compared to FIG. 4 in which only final fingerprint data can be provided after the last cycle, the example illustrated by FIG. 5 based on the method of FIG. 3 can provide pre-scanned fingerprint data after each cycle of a fingerprint sensing cycle set so that the application program based on fingerprint identification can be configured to process the pre-scanned fingerprint data early before the final fingerprint data is available. In this manner, the fingerprint identification and process of the application program can be done earlier. Therefore, the method can facilitate the performance or efficiency of the application program based on fingerprint identification in accordance with pre-scanned fingerprint data provided by the method.

The method of FIG. 3 can be implemented in various implementations of an electronic module (e.g., 10, 10A, 10B, or 10C). In some implementations of an electronic module which is an integration of a display driver, touch sensing driver and a fingerprint sensing driver, the electronic module can be implemented as a single chip, which can be referred to as a fingerprint, touch, display integrated circuit (FTDI). In the single chip, the operation cycles including cycles for different functional portions, such as display cycles for the display driver and fingerprint cycles (or called fingerprint sensing cycles) for the fingerprint sensing driver, in contrast to that illustrated in FIG. 5. The single chip can be configured to provide computing and/or hardware resource for the functional portion when the display cycle or fingerprint cycle is performed or active. The following provides embodiments based on the method of FIG. 3 implemented on the single chip.

Figure 6:
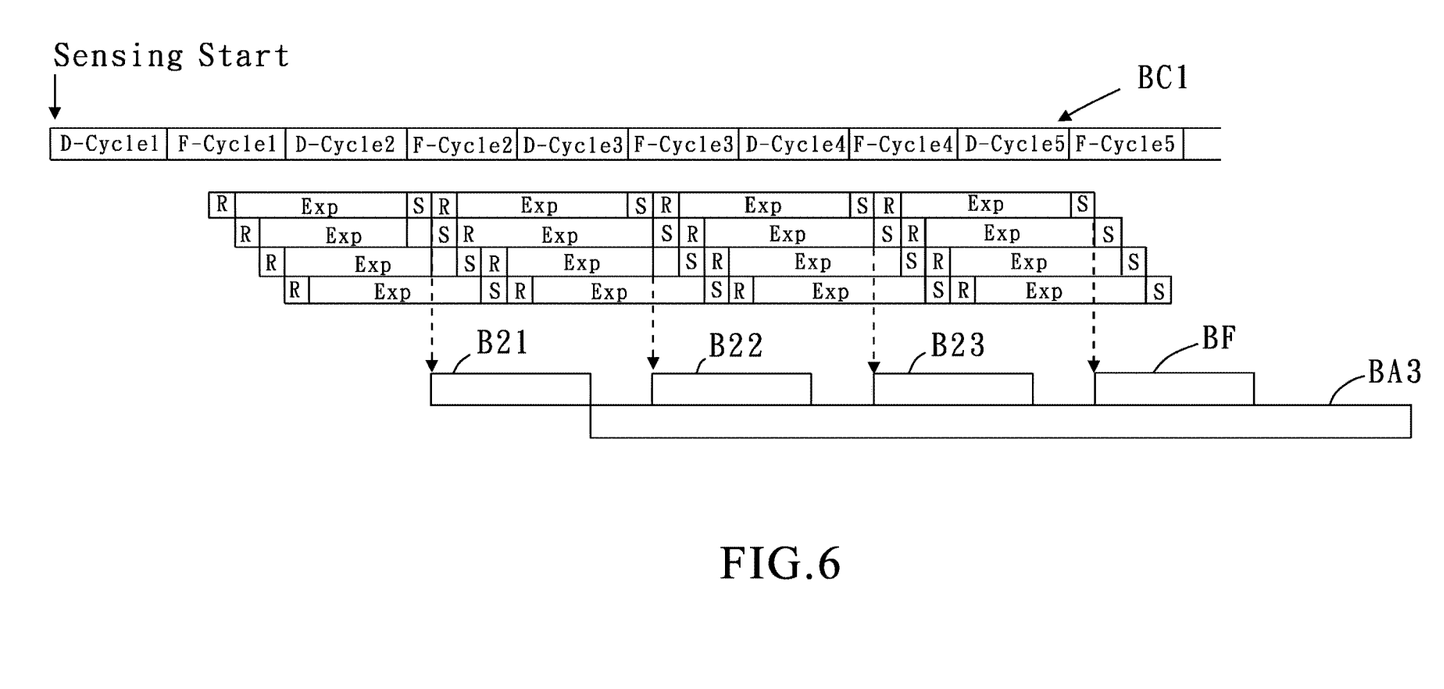
FIG. 6 is a schematic timing diagram illustrating an example of providing pre-scanned fingerprint data for an application program after at least one of the fingerprint sensing cycles, which is not the last fingerprint sensing cycle.

In an embodiment, an operation timing diagram for a single chip such as FTDI (e.g., FIG. 2B) is shown in FIG. 6. In this embodiment, the single chip has two kinds of operation cycles, display cycles and fingerprint cycles, being performed (or active) alternately, as represented by a block row BC1 in FIG. 6. In the application of FTDI, the operation cycles of fingerprint sensing are fingerprint cycles (e.g., represented by blocks F-cycle1, F-cycle2 to F-cycle5). In this embodiment, the method based on FIG. 3 is implemented in the single chip so that pre-scanned fingerprint data will be begun to be prepared after a fingerprint cycle F-cycle 1 at a fingerprint cycle F-cycle2 and outputted to the application program (which can execute the corresponding algorithm) for fingerprint identification such as processing for preparation of fingerprint comparison. For example, a block B21 (or B22, B23) in FIG. 6 represents a time period for the pre-scanned fingerprint data to be prepared and outputted after a fingerprint sensing cycle. For example, in FIG. 6, a block BA3 represents that the application program's process proceeds in advance after the fingerprint cycle F-cycle2 is completed. In FIG. 6, the display cycles are represented by D-cycle1, D-cycle2, etc., and the display cycles (D-cycle) and fingerprint cycles (F-cycle) appear alternately. In a single chip such as FTDI, display and fingerprint related tasks are processed at different time periods during the progress of internal timing of the signal chip; for example, an interface of the single chip (e.g., for data output to the processing unit) is assigned to be utilized for related data for display or fingerprint at different time periods. However, the present invention is not limited to the above examples. When the method is implemented in an embodiment such as that in FIG. 6 or other embodiments related to providing pre-scanned fingerprint data in advance, the method based on FIG. 3 may be implemented or configured, regardless of the above example related to the display cycles.

As compared to FIG. 4 in which only final fingerprint data can be provided, the embodiment illustrated by FIG. 6 based on the method of FIG. 3 can provide pre-scanned fingerprint data after each cycle of a fingerprint sensing cycle set so that the processing unit which executes the application program based on fingerprint identification can be configured to process the pre-scanned fingerprint data early before the final fingerprint data is available. Accordingly, the method can facilitate the performance or efficiency of the application program based on fingerprint identification.

In some embodiments of the method based on FIG. 3, pre-scanned fingerprint data may include a truncated fingerprint image to facilitate the implementation of fingerprint sensing in particular corresponding to a large-sized display screen. Regarding the scenario of the embodiment of a single chip having display cycles and fingerprint cycles as in FIG. 6, the time period for each fingerprint cycle is concerned. In terms of a display frequency of 60 Hz, for example, the time period of each cycle is 16.6 ms, and the transmission time of image data output for fingerprint sensing is approximately equal to:

Interface_transfer_period_time*Panel_X_size*Panel_Y_size*BPP, wherein Interface_transfer_period_time represents a time period for interface transfer, Panel_X_size and Panel_Y_size represent a size of a panel (e.g., 2340×1080), and BPP represents bits number per fingerprint sensing pixel.

Accordingly, in a practical application of fingerprint identification on a large-sized screen, the increased X, Y size (e.g., Panel_X_size and Panel_Y_size) will inevitably cause a longer transmission time, which will affect the next fingerprint cycle working interval; for example, the transmission time is greater than 16.6 ms*2, i.e., 33.2 ms. In this situation, the transmitted bit number per pixel can be processed in order to facilitate pre-scanning process for providing pre-scanned fingerprint data. In an example, assuming that the originally transmitted bit number per pixel is 12 bits, in large-sized screen applications, the pre-scanned fingerprint data is implemented to include truncated fingerprint data, such as a truncated fingerprint image or truncated fingerprint pixel information, in a reduced bit number per pixel, such as 8 bits, 10 bits or other suitable bit size, in order to make the pre-scanned fingerprint data capable of being transmitted in an appropriate transmission time without affecting the next fingerprint cycle and make the pre-scanning process workable. Thus, in the example, the method based on FIG. 3 facilitates the providing the pre-scanned fingerprint data that includes truncated fingerprint information (e.g., for the time periods represented by the blocks B21, B22, B23) and the processing unit to be configured to process the pre-scanned fingerprint data in advance, thereby improving the efficiency of the application program executed by the processing unit. Further, in the above example, the final fingerprint data is implemented in its original bits number (e.g., 12 bits) or a reduced bits number (e.g., 8 or 10 bits).

Figure 7:
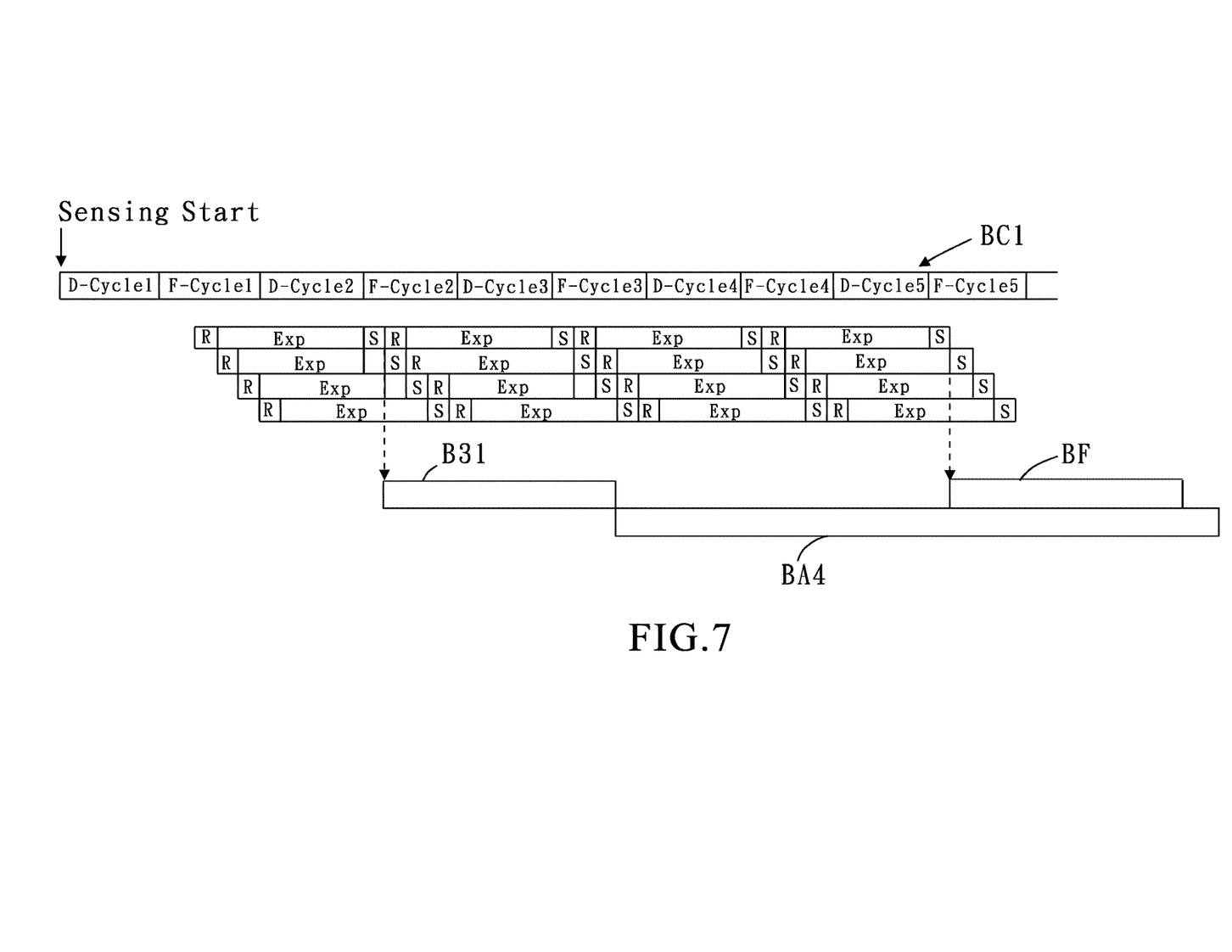
FIG. 7 is a schematic timing diagram illustrating an example of providing pre-scanned fingerprint data for an application program after at least one of the fingerprint sensing cycles, which is not the last fingerprint sensing cycle.

In another embodiment of the method based on FIG. 3, the pre-scanned fingerprint data is implemented to include pixel image data in the original bits number per pixel (e.g., 12 bits) without truncation and can be transmitted to the processing unit which executes the application program performing a corresponding algorithm for processing based on fingerprint identification. As illustrated in FIG. 7, the transmission time, as represented by a block B31, of the pre-scanned fingerprint data in the original number of bits (such as 12 bits) will be greater (or longer) than the transmission time, as represented by the block B21 in the example of FIG. 6, of the pre-scanned fingerprint data in reduced data bits number per pixel (such as data in 8 or 10 bits). The greater transmission time of the pre-scanned fingerprint data as illustrated in FIG. 7 may affect the time that can be taken in the next fingerprint cycle (e.g., represented by F-cycle3 in FIG. 7) for interface transmission, leading to a conflict of transmission interface control rights. As shown in FIG. 7, the transmission time for the pre-scanned fingerprint data for the fingerprint sensing cycle F-cycle1 has been greater than 33.2 ms, for example, which affects the image data readout for the fingerprint sensing cycle F-cycle2. Accordingly, in this example, in order not to make conflict between the fingerprint sensing cycles F-cycle3 and F-cycle4, the pre-scanned fingerprint data (e.g., pre-scanned fingerprint image data in 12 bits) for the fingerprint sensing cycle F-cycle1 will be outputted to the processing unit that executes an application program for processing, and no pre-scanned fingerprint data will be provided for the fingerprint sensing cycles F-cycle2 and F-cycle3 to avoid conflicts for the interface, and finally the final fingerprint data (e.g., final average image) will be provided, as represented by a block BF in FIG. 7, for the application program (which can execute the corresponding algorithm). For example, in FIG. 7, a block BA4 represents that the application program's process proceeds in advance after the fingerprint cycle F-cycle2 is completed.

The various embodiments disclosed above can facilitate the performance or efficiency of the application program based on fingerprint identification. Under the performing of a predetermined number of consecutive fingerprint sensing cycles, the method of FIG. 3 can provide pre-scanned fingerprint data after each cycle of a fingerprint sensing cycle set so that the processing unit which executes the application program based on fingerprint identification can be configured to process the pre-scanned fingerprint data early before the final fingerprint data is available, for example, to determine whether a match occurs in a fingerprint comparison. If the application program determines that the match occurs (e.g., a match occurs when the pre-scanned fingerprint data matches a registered fingerprint stored in a database or memory), the time for the application program for unlocking the computing device, for example, can be finished earlier. Accordingly, the method can facilitate the performance or efficiency of the application program based on fingerprint identification and better user experience as well.

The following provides various embodiments for implementations of the method based on FIG. 3. The embodiments can be implemented by an electronic module (or a fingerprint sensing driver) or a computing device, as illustrated in any one of FIG. 1, 2A-2C.

In an embodiment, in step S30 of the method based on FIG. 3, the pre-scanned fingerprint data is provided to the processing unit (e.g., processing unit 5 in any one of FIGS. 1, 2A-2C) in response to a request from the processing unit after the informing, as indicated by step S20 of FIG. 3, is performed after the each cycle of the fingerprint sensing cycle set. For example, the electronic module (e.g., 10, 10A, 10B, or 10C) or the fingerprint sensing driver (e.g., 11 or 11A) is configured to transmit an indication signal for informing the processing unit that the fingerprint sensing driver is ready for providing pre-scanned fingerprint data after the each cycle of the fingerprint sensing cycle set, and the processing unit can be configured to send a request in response to the indication signal in order to obtain the pre-scanned fingerprint data.

Figure 8:
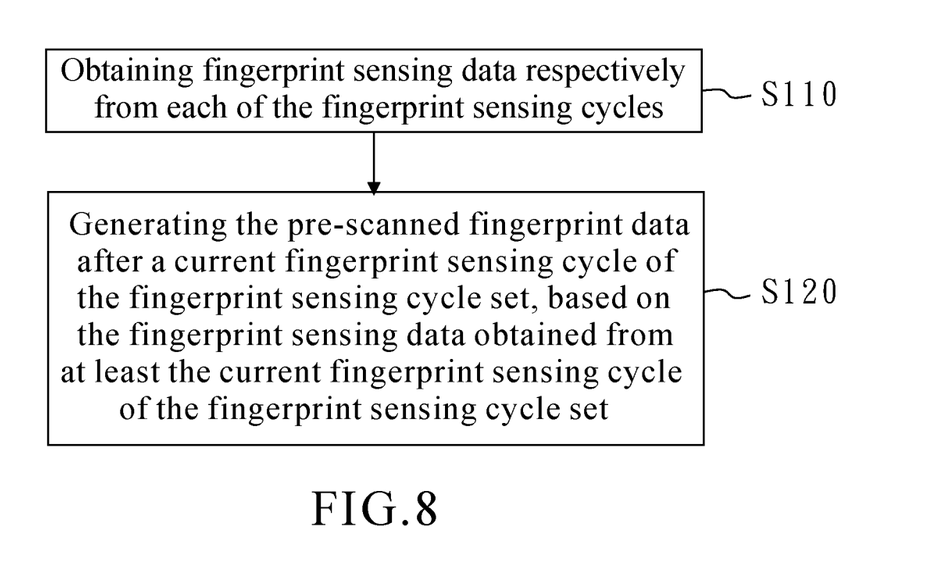
FIG. 8 is a flowchart illustrating a method for performing fingerprint sensing according to an embodiment based on FIG. 3.

In an embodiment, the method based on FIG. 3 further comprises the following steps shown in FIG. 8. As illustrated in step S110, fingerprint sensing data respectively is obtained from each of the fingerprint sensing cycles. As shown in step S120, the pre-scanned fingerprint data after a current fingerprint sensing cycle of the fingerprint sensing cycle set is generated based on the fingerprint sensing data obtained from at least the current fingerprint sensing cycle of the fingerprint sensing cycle set. As an example of step S110, the fingerprint sensing driver 11 or 11A (or the fingerprint sensing circuit 110) is configured to obtain the fingerprint sensing data from each of the fingerprint sensing cycles by reading signals from the fingerprint sensor 95. As an example of step S120, the fingerprint sensing driver 11 or 11A (or the fingerprint sensing circuit 110) is configured to generate the pre-scanned fingerprint data.

In an embodiment, the pre-scanned fingerprint data, as in step S30 or S120, is an average of the fingerprint sensing data obtained from the current fingerprint sensing cycle of the fingerprint sensing cycle set and the fingerprint sensing data obtained from at least one previous fingerprint sensing cycle of the fingerprint sensing cycle set prior to the current fingerprint sensing cycle.

Figure 9:
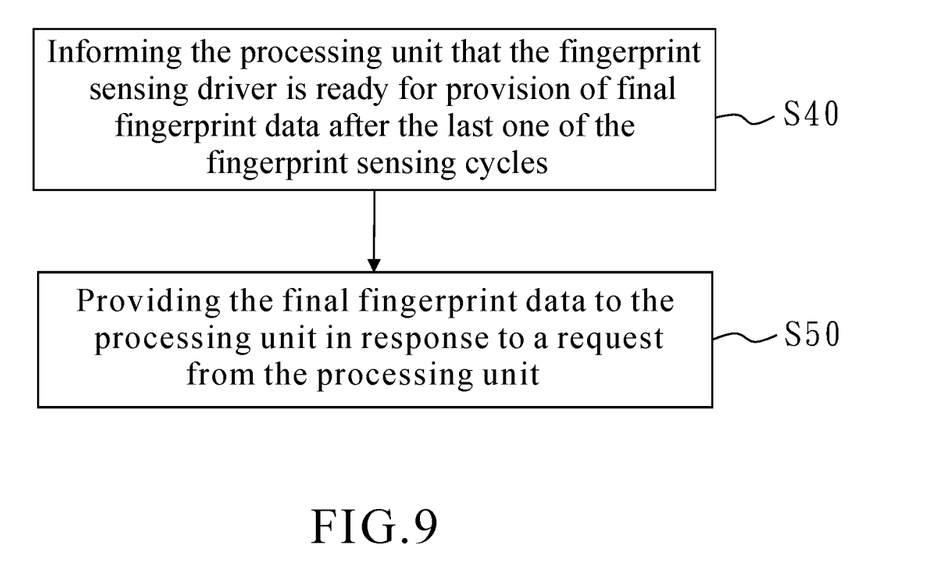
FIG. 9 is a flowchart illustrating a method for performing fingerprint sensing according to an embodiment based on FIG. 3.

In an embodiment, the method based on FIG. 3 further includes the following steps shown in FIG. 9. As indicated in step S40, the processing unit (e.g., processing unit 5 in any one of FIGS. 1, 2A-2C) is informed that the fingerprint sensing driver is ready for providing final fingerprint data after the last one of the fingerprint sensing cycles. As indicated in step S50, the fingerprint sensing driver (e.g., 11 or 11A) provides the final fingerprint data to the processing unit in response to a request from the processing unit.

Figure 10:
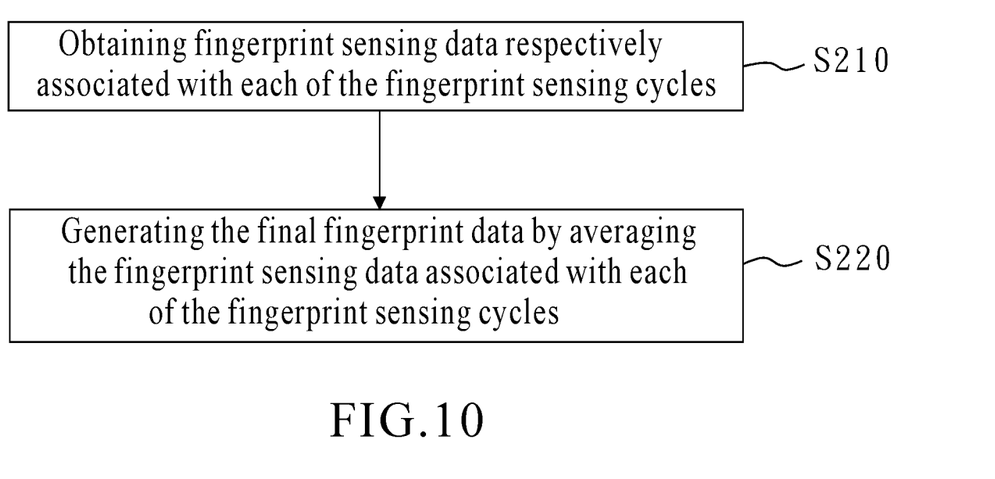
FIG. 10 is a flowchart illustrating a method for performing fingerprint sensing according to an embodiment based on FIG. 3.

In an embodiment, the method based on FIG. 3 further includes the following steps shown in FIG. 10. As indicated in step S210, fingerprint sensing data respectively associated with each of the fingerprint sensing cycles is obtained. As indicated in step S220, the final fingerprint data is generated by averaging the fingerprint sensing data associated with each of the fingerprint sensing cycles. As an example, the control unit 112 can obtain the fingerprint sensing data respectively associated with each of the fingerprint sensing cycles, stored in a memory 115, as shown in FIG. 1, and can generate the final fingerprint data accordingly.

In an embodiment, the method based on FIG. 3 further includes completing the predetermined number of consecutive fingerprint sensing cycles regardless of whether a match is achieved by the processing unit with the pre-scanned fingerprint data.

Figure 11:
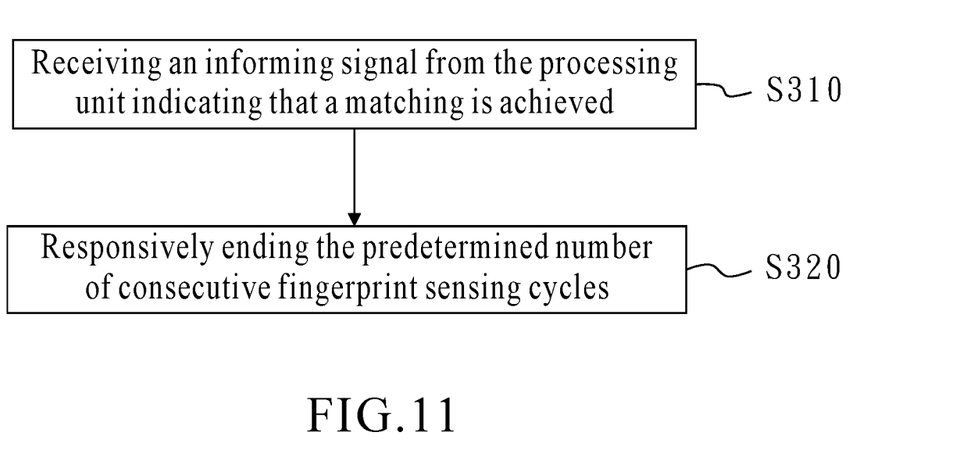
FIG. 11 is a flowchart illustrating a method for performing fingerprint sensing according to an embodiment based on FIG. 3.

In an embodiment, the method based on FIG. 3 further includes the following steps shown in FIG. 11. As illustrated in step S310, an informing signal is received from the processing unit indicating that a match is achieved. As illustrated in step S320, responsively ending the predetermined number of consecutive fingerprint sensing cycles. For example, the electronic module or the fingerprint sensing driver is configured to receive the informing signal and end (or interrupt) the predetermined number of consecutive fingerprint sensing cycles if the electronic module or the fingerprint sensing driver determines that the informing signal indicates a match is achieved by the application program. For example, as shown in FIG. 5, 6 or 7, if a match for fingerprint identification is achieved by the processing unit with respect to the pre-scanned fingerprint data after the fingerprint sensing cycle before the last fingerprint sensing cycle, the processing unit may send an informing signal to end the remaining fingerprint sensing cycle. In this way, the hardware and/or computing resources of the electronic module or the fingerprint sensing driver can be saved so that reduction of power dissipation can be achieved.

In an embodiment, in step S20 of the method based on FIG. 3, the fingerprint sensing cycle set includes every fingerprint sensing cycle before the last one of the fingerprint sensing cycles. For example, the electronic module or the fingerprint sensing driver is configured to provide the pre-scanned fingerprint data after each cycle of the fingerprint sensing cycle set, as illustrated in FIG. 5 or 6, wherein the providing pre-scanned fingerprint data is represented by the blocks B11, B12, B13; or B21, B22, B23.

In some embodiments, in step S20 of the method based on FIG. 3, the fingerprint sensing cycle set does not include every fingerprint sensing cycle before the last one of the fingerprint sensing cycles. For example, the electronic module or the fingerprint sensing driver is configured to provide the pre-scanned fingerprint data after each cycle of the fingerprint sensing cycle set, wherein the fingerprint sensing cycle set may be one, two or some cycles but not every cycle before the last one of the fingerprint sensing cycles. For example, referring to FIG. 7, after the fingerprint sensing cycle F-cycle1, only a piece of pre-scanned fingerprint data is provided, as represented by the block B31. In another example, the number of providing pre-scanned fingerprint data as illustrated in FIG. 5 or 6 is reduced.

In an embodiment of the method based on FIG. 3, each of the fingerprint sensing cycles includes operations including a reset operation, an exposure operation, and a sampling operation, for example, as illustrated in FIG. 5, 6, or 7.

Figure 2C:
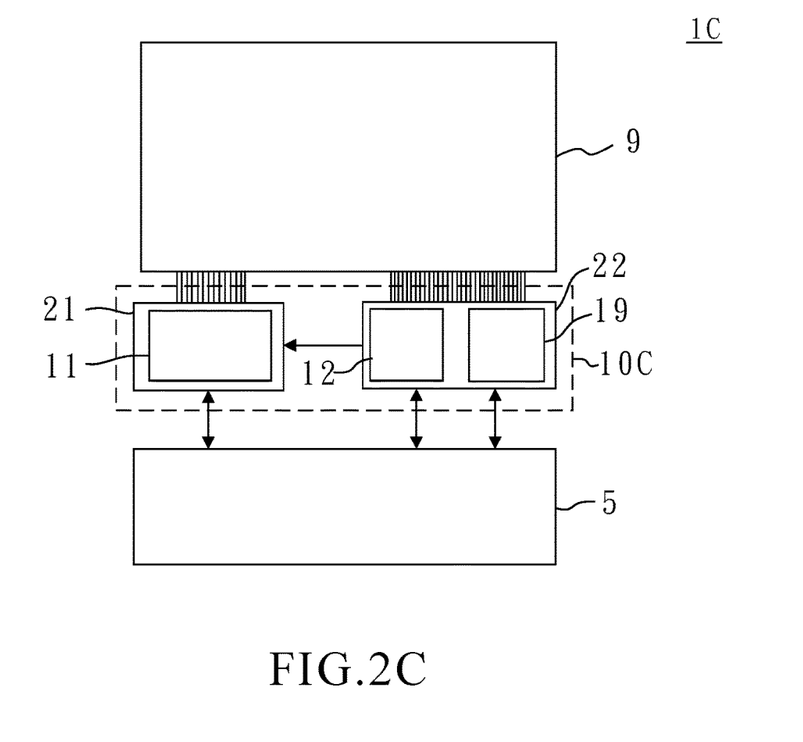
FIG. 2C is a block diagram illustrating implementation of an electronic module capable of performing fingerprint sensing in a computing device according to another embodiment.

In an embodiment of the method based on FIG. 3, the pre-scanned fingerprint data includes fingerprint image data. For example, the fingerprint image data is generated by using signals obtained from the plurality of fingerprint sensing elements (or pixels) in a row by row manner. For example, in a practical application of fingerprint sensing in a large-sized screen or full-screen, the fingerprint image data is generated by using signals from a portion of the plurality of fingerprint sensing elements (or pixels) associated with a representative touch position obtained by a touch sensing driver (e.g., touch sensing driver 12 as illustrated in FIG. 2A, 2B, or 2C). For example, the fingerprint sensing driver (e.g., 11 or 11A) is configured to receive the representative touch position from the touch sensing driver 12 and reading signals from a portion associated the representative touch position. In this way, the computing and/or hardware resource of the fingerprint sensing driver or the electronic module can be effectively and efficiently utilized with the contribution of the representative touch position.

In an embodiment of the method based on FIG. 3, the pre-scanned fingerprint data includes information related to fingerprint image, such as information of the fingerprint image (e.g., its size), an average value of brightness of a region where the fingerprint image occurs.

In an embodiment, the pre-scanned fingerprint data includes a truncated fingerprint image obtained by the fingerprint sensing cycle, as illustrated in FIG. 6.

In an embodiment, in step S20 of the method based on FIG. 3, the fingerprint sensing cycle set includes two or more neighboring fingerprint sensing cycles.

In an embodiment, the pre-scanned fingerprint data includes a non-truncated fingerprint image obtained by the fingerprint sensing cycle, as illustrated in FIG. 7.

In an embodiment, the fingerprint sensing cycle set does not include two or more neighboring fingerprint sensing cycles.

In an embodiment, the method based on FIG. 3 further includes, after one of the fingerprint sensing cycles is performed, updating content of a memory by the fingerprint sensing driver using corresponding fingerprint sensing data obtained from the one of the fingerprint sensing cycles. For example, the memory is a memory (e.g., memory 115 in FIG. 1) embedded in the fingerprint sensing driver, or a memory external to the fingerprint sensing driver. For example, the electronic module or fingerprint sensing driver is configured to store the fingerprint sensing data after one of the fingerprint sensing cycles is performed in the memory. In an example, the electronic module or fingerprint sensing driver is configured to update the content of the memory by results of computation (e.g., averaging) based on the previous fingerprint sensing data and current fingerprint sensing data. In an example, after updating of the memory, the previous fingerprint sensing data is covered by the results. Certainly, the implementation of the present disclosure is not limited to the examples.

In some embodiments, the method based on FIG. 3 further comprises performing a fingerprint identification process based on the pre-scanned fingerprint data. For example, the method in this embodiment is implemented in a computing device (e.g., computing device 1, 1A, 1B, or 1C), and can be considered as a method for the computing device.

In some embodiments, the electronic module is a single chip.

As illustrated in the above various embodiments, a method for performing fingerprint sensing, an electronic module for performing fingerprint sensing, and a computing device are provided. The method provides pre-scanned fingerprint data after each cycle of a fingerprint sensing cycle set, the fingerprint sensing cycle set including one or more cycles of the fingerprint sensing cycles except for a last one of the fingerprint sensing cycles, so that the processing unit which executes the application program based on fingerprint identification can be configured to process the pre-scanned fingerprint data early before the final fingerprint data is available, to facilitate the enhancement of the application program's efficiency.

While the present disclosure has been described by means of specific embodiments, numerous modifications and variations could be made thereto by those skilled in the art without departing from the scope and spirit of the present disclosure set forth in the claims.

What is claimed is:

1. A method for performing fingerprint sensing, the method comprising:
    performing a predetermined number of consecutive fingerprint sensing cycles;
    informing a processing unit that a fingerprint sensing driver is ready for providing pre-scanned fingerprint data after each cycle of a fingerprint sensing cycle set, wherein the fingerprint sensing cycle set includes at least one of the fingerprint sensing cycles except for a last one of the fingerprint sensing cycles; and
    providing the processing unit with the pre-scanned fingerprint data obtained from the each cycle of the fingerprint sensing cycle set.

2. The method according to claim 1, further comprising:
    completing the predetermined number of consecutive fingerprint sensing cycles regardless of whether or not a match is achieved by the processing unit with the pre-scanned fingerprint data.

3. The method according to claim 1, wherein the fingerprint sensing cycle set includes every fingerprint sensing cycle before the last one of the fingerprint sensing cycles.

4. The method according to claim 1, wherein the fingerprint sensing cycle set does not include every fingerprint sensing cycle before the last one of the fingerprint sensing cycles.

5. The method according to claim 1, wherein each of the fingerprint sensing cycles includes operations including a reset operation, an exposure operation, and a sampling operation.

6. The method according to claim 1, wherein the pre-scanned fingerprint data includes fingerprint image data.

7. The method according to claim 1, wherein the pre-scanned fingerprint data includes information related to fingerprint image.

8. The method according to claim 1, further comprising, after one of the fingerprint sensing cycles is performed, updating content of a memory by the fingerprint sensing driver using corresponding fingerprint sensing data obtained from the one of the fingerprint sensing cycles.

9. The method according to claim 1, further comprising performing a fingerprint identification process based on the pre-scanned fingerprint data.

10. An electronic module capable of performing fingerprint sensing, comprising:
    a fingerprint sensing driver including:
        a fingerprint sensing circuit for being coupled to a fingerprint sensor and obtaining fingerprint sensing data; and
        a control unit, coupled to the fingerprint sensing circuit, for performing a predetermined number of consecutive fingerprint sensing cycles,
    wherein the control unit informs a processing unit that the fingerprint sensing driver is ready for providing pre-scanned fingerprint data after each cycle of a fingerprint sensing cycle set, wherein the fingerprint sensing cycle set includes at least one of the fingerprint sensing cycles except for a last one of the fingerprint sensing cycles; and the control unit provides the processing unit with the pre-scanned fingerprint data obtained from the each cycle of the fingerprint sensing cycle set.

11. The electronic module according to claim 10, wherein the control unit completes the predetermined number of consecutive fingerprint sensing cycles regardless of whether a match is achieved by the processing unit with the pre-scanned fingerprint data.

12. The electronic module according to claim 10, wherein the fingerprint sensing cycle set includes every fingerprint sensing cycle before the last one of the fingerprint sensing cycles.

13. The electronic module according to claim 10, wherein the fingerprint sensing cycle set does not include every fingerprint sensing cycle before the last one of the fingerprint sensing cycles.

14. The electronic module according to claim 10, wherein each of the fingerprint sensing cycles includes operations including a reset operation, an exposure operation, and a sampling operation.

15. The electronic module according to claim 10, wherein the pre-scanned fingerprint data includes fingerprint image data.

16. The electronic module according to claim 10, wherein the pre-scanned fingerprint data includes information related to fingerprint image.

17. The electronic module according to claim 10, wherein after one of the fingerprint sensing cycles is performed, the control unit updates content of a memory by the fingerprint sensing driver using corresponding fingerprint sensing data obtained from the one of the fingerprint sensing cycles.

18. The electronic module according to claim 10, wherein a fingerprint identification process is performed based on the pre-scanned fingerprint data.

19. The electronic module according to claim 10, wherein the electronic module is a single chip.

20. A computing apparatus comprising:
   a fingerprint sensor;
   a processing unit; and
   an electronic module capable of performing fingerprint sensing, coupled between the fingerprint sensor and the processing unit, the electronic module comprising:
      a fingerprint sensing driver, coupled to the fingerprint sensor, for obtaining fingerprint sensing data,
   wherein the fingerprint sensing driver performs a predetermined number of consecutive fingerprint sensing cycles, the fingerprint sensing driver informs the processing unit that the fingerprint sensing driver is ready for providing pre-scanned fingerprint data after each cycle of a fingerprint sensing cycle set, wherein the fingerprint sensing cycle set includes at least one of the fingerprint sensing cycles except for a last one of the fingerprint sensing cycles; and the fingerprint sensing driver provides the processing unit with the pre-scanned fingerprint data obtained from the each cycle of the fingerprint sensing cycle set.

21. The computing apparatus according to claim 20, wherein the processing unit performs a fingerprint identification process based on the pre-scanned fingerprint data.

22. The computing apparatus according to claim 20, wherein the electronic module is a single chip.

\* \* \* \* \*